US006729632B2

United States Patent
Ferrigan

(10) Patent No.: US 6,729,632 B2
(45) Date of Patent: May 4, 2004

(54) COLLAPSIBLE RACK FOR AN AUTOMOTIVE BODY PANEL

(75) Inventor: Paul J. Ferrigan, Charlotte, NC (US)

(73) Assignee: Saratoga Technologies, Inc., Charlotte, NC (US)

( * ) Notice: Subject to any disclaimer, the term of this patent is extended or adjusted under 35 U.S.C. 154(b) by 0 days.

(21) Appl. No.: 10/192,047

(22) Filed: Jul. 9, 2002

(65) Prior Publication Data

US 2004/0007839 A1 Jan. 15, 2004

(51) Int. Cl.[7] .................................................. B62B 1/00
(52) U.S. Cl. ...................................... 280/79.7; 248/129
(58) Field of Search .............................. 280/651, 79.7, 280/47.34, 47.36, 47.371; 248/129, 150, 166, 127, 128; 211/195

(56) References Cited

U.S. PATENT DOCUMENTS

| 1,560,164 | A | * | 11/1925 | Jarnagin | 414/457 |
|---|---|---|---|---|---|
| 2,466,149 | A | * | 4/1949 | Burg | 280/79.7 |
| 2,514,308 | A | * | 7/1950 | Burg | 280/79.3 |
| 3,132,875 | A | * | 5/1964 | Plumley | 280/47.34 |
| 3,197,226 | A | * | 7/1965 | Erlinder | 280/646 |
| 3,712,652 | A | * | 1/1973 | Uilkema | 403/108 |
| 4,326,726 | A | * | 4/1982 | Dunchock | 280/79.3 |
| D304,118 | S | * | 10/1989 | Snoke et al. | D34/31 |
| 5,221,066 | A | * | 6/1993 | Ferrigan et al. | 248/166 |
| 5,762,348 | A | * | 6/1998 | Echternacht | 280/79.7 |
| 6,019,235 | A | * | 2/2000 | Ferrigan | 211/195 |
| 6,409,128 | B1 | * | 6/2002 | Deshler | 248/127 |

* cited by examiner

Primary Examiner—Bryan Fischmann
(74) Attorney, Agent, or Firm—McCormick, Paulding & Huber LLP

(57) ABSTRACT

A collapsible rack for supporting an automotive body panel, such as a removable automobile hardtop. The collapsible rack supports the panel and becomes more compact for storage. The collapsible rack has a T-shaped member that is removable for placement of the rack in a truck of an automobile, or for stowage in a neck defined by the frame. In a first position, the frame and member hold the hardtop or automotive body panel upright. In a second position, the member is stowed in the frame.

6 Claims, 4 Drawing Sheets

COLLAPSIBLE RACK FOR AN AUTOMOTIVE BODY PANEL

FIELD OF THE INVENTION

The invention relates generally to ancillary automotive equipment and more specifically to a collapsible rack for supporting an automotive body panel, such as a removable hardtop roof.

BACKGROUND OF THE INVENTION

Some cars are equipped with automotive body panels that can be removed. Removal of the automotive body panel can either be for short periods of time, such as portions of days or several days, or for extended periods, such as months. A removable automotive body panel gives the automobile owner the ability to reconfigure their automobile for any number of reasons.

The removal of an automotive body panel, however, presents the automobile owner with an issue of what to do with the automotive body panel until it is reinstalled on the automobile. The storage location of the automotive body panel must protect the automotive body panel against damage. Therefore, suitable supports and padding must be provided. An additional issue, however, to be considered is that automotive body panels can be heavy and/or bulky making lifting awkward and difficult. Therefore, if the storage location is not proximate to a location to which the automobile can be brought for removal of the automotive body panel, movement of the automotive body panel to the storage location must be accomplished. Movement of the automotive body panel can be difficult and can potentially cause damage to the automotive body panel.

One typical method of storing and moving an automotive body panel is to place it in a rack having wheels. However, a rack is typically not in use all of the time and, therefore, must be stored when it is not. For example, hardtop roofs, which are available for some convertible cars, can be typically stored for up to several months and then used for several months. Therefore, the rack must not only have the necessary structure to support and protect the automotive body panel, but it must have provisions to be easily stored when not holding the automotive body panel.

Based on the foregoing, it is the object of this invention to overcome the problems and drawbacks associated with the prior art.

SUMMARY OF THE INVENTION

The present invention is a collapsible rack for an automotive body panel, such as a hard top. The collapsible rack has a rigid frame with at least two abutment surfaces. A member projects outwardly from the frame and defines a support. The member is coupled to the frame to permit placement of the member in a first position or a second position. In the first position, the support of the member is so arranged to cooperate with the abutment surfaces to define a resting site for the automotive body panel and the member in the second position has the support either located relatively closer to the abutment surfaces, or laid alongside the frame.

With the member in its first position, the collapsible rack is designed to support the automotive body panel, while in the second position the collapsible rack is designed to be stored. As such, the collapsible rack takes up a much smaller volume in the stowed condition. In the preferred embodiment of the present invention, the frame has a plurality of wheels attached thereto that permit the collapsible rack to be rolled in both the first, with or without the automotive body part therein, and second positions. This assists in bring the empty collapsible rack to a location to be loaded, moving the loaded collapsible rack to a storage location, and storing an empty collapsible rack. As with any collapsible rack designed to hold items subject to damage from scratching due to contact with the surfaces of the collapsible rack, the collapsible rack optimally employs appropriate padding.

DETAILED DESCRIPTION OF THE PREFERRED EMBODIMENT

Figure 1:
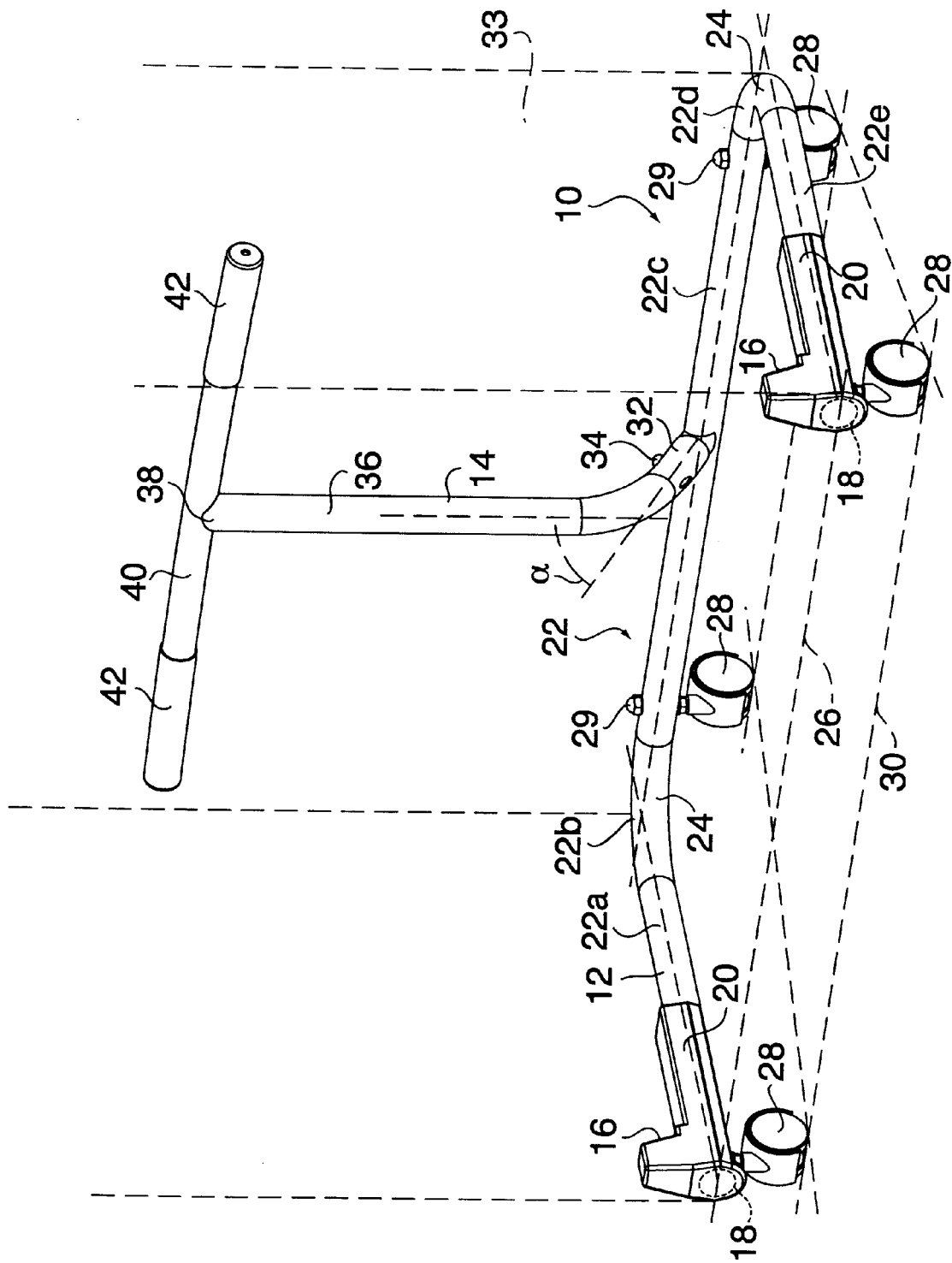
FIG. 1 is a perspective view of the collapsible rack with the member in the first position.
Figure 4:
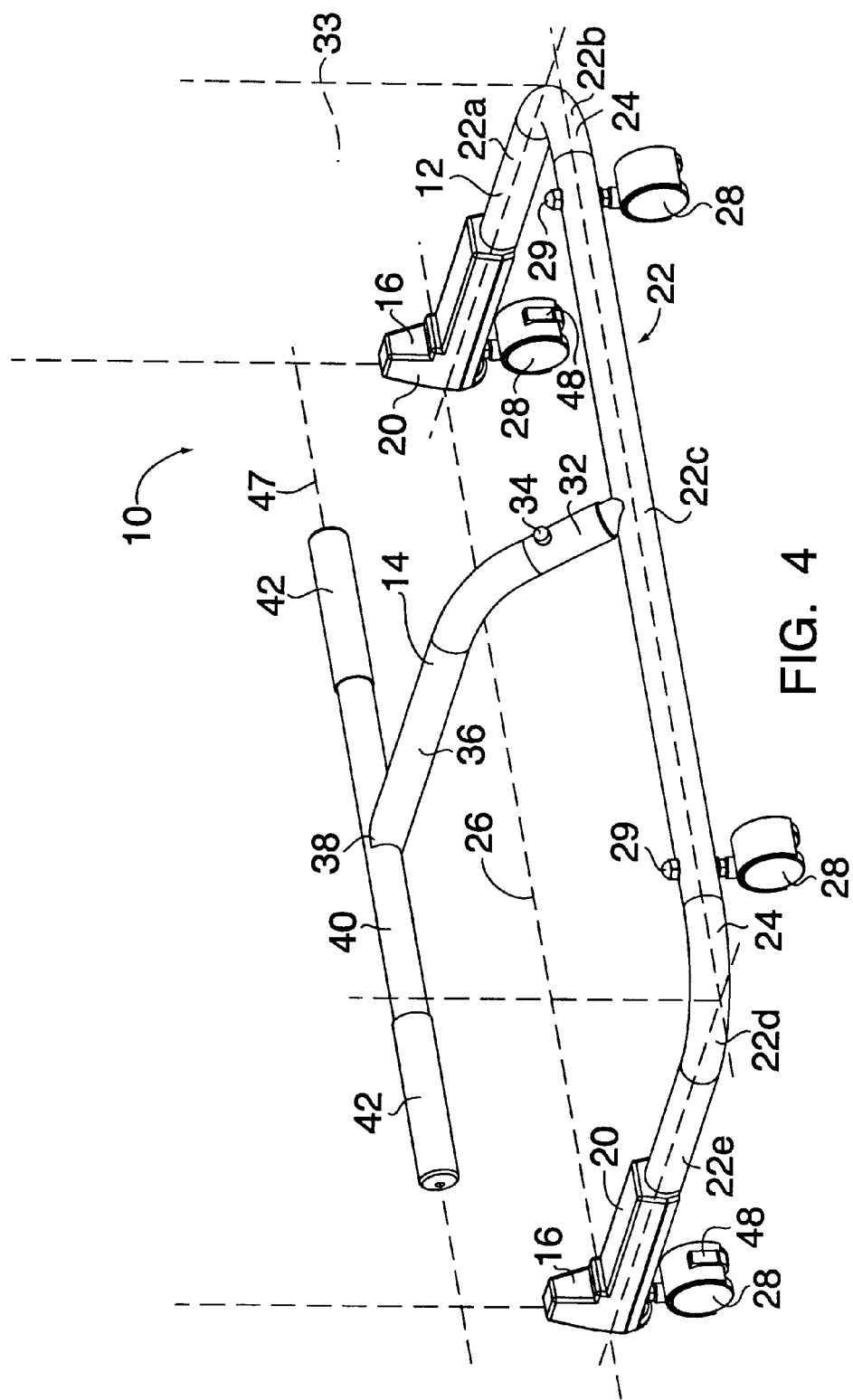
FIG. 4 is a perspective view of the collapsible rack with the member in the second position.

As shown in FIG. 1, the collapsible rack, generally referred to by reference number 10, has a rigid frame 12 and projecting upwardly therefrom a member 14. Referring to FIGS. 1 and 4, the member 14 has two positions. The first position, as shown in FIG. 1, is the position wherein the member extends at a right angle from the frame 12. In this position, the collapsible rack 10 is ready to receive and support an automotive body panel. In the second position, shown in FIG. 4, the member has been repositioned relative to the frame 12 into a position to accommodate easy storage.

Returning to FIG. 1, the frame 12 has two abutment surfaces 16 positioned on the frame 12, with one proximate each end 18 of the frame 12. Each abutment surface 16 is defined by a bumper 20 that attaches to frame 12. The abutment surfaces 16 can be created by any number of methods including but not limited to bends in the frame 12. The location of the abutment surfaces 16 on the frame 12 is application dependent. Where the abutment surfaces 16 are placed at the ends 18 and bumpers 20 are employed, the bumpers 20 can double as end caps for the ends 18 of the frame 12.

The frame 12 is rigid. It is depicted as manufactured from a tubular element, but other structures can be used depending upon the application. The frame 12 can be made from a single piece 22 or any number of segments 22 a–e. Where multiple segments 22 a–e are used, the segments 22 a–e are attached in turn one to the other and are fixed in position relative one to the other by any suitable means, such as welding or through bolts and nuts. The frame can be of any shape, but a simple U shape having two corners 24 is preferred. The U shape defines a plane 26.

The frame 12 has a plurality of wheels 28. The wheels 28 are attached to the frame 12 by any suitable means, such as threaded fasteners with nuts 29. The wheels 28, which define a plane 30, are attached to the frame 12 opposed to the member 14 such that the wheels allow the collapsible rack 10 to be rolled on the wheels 28 with the member 14 in either the first (loaded or unloaded) or second position.

Figure 2:
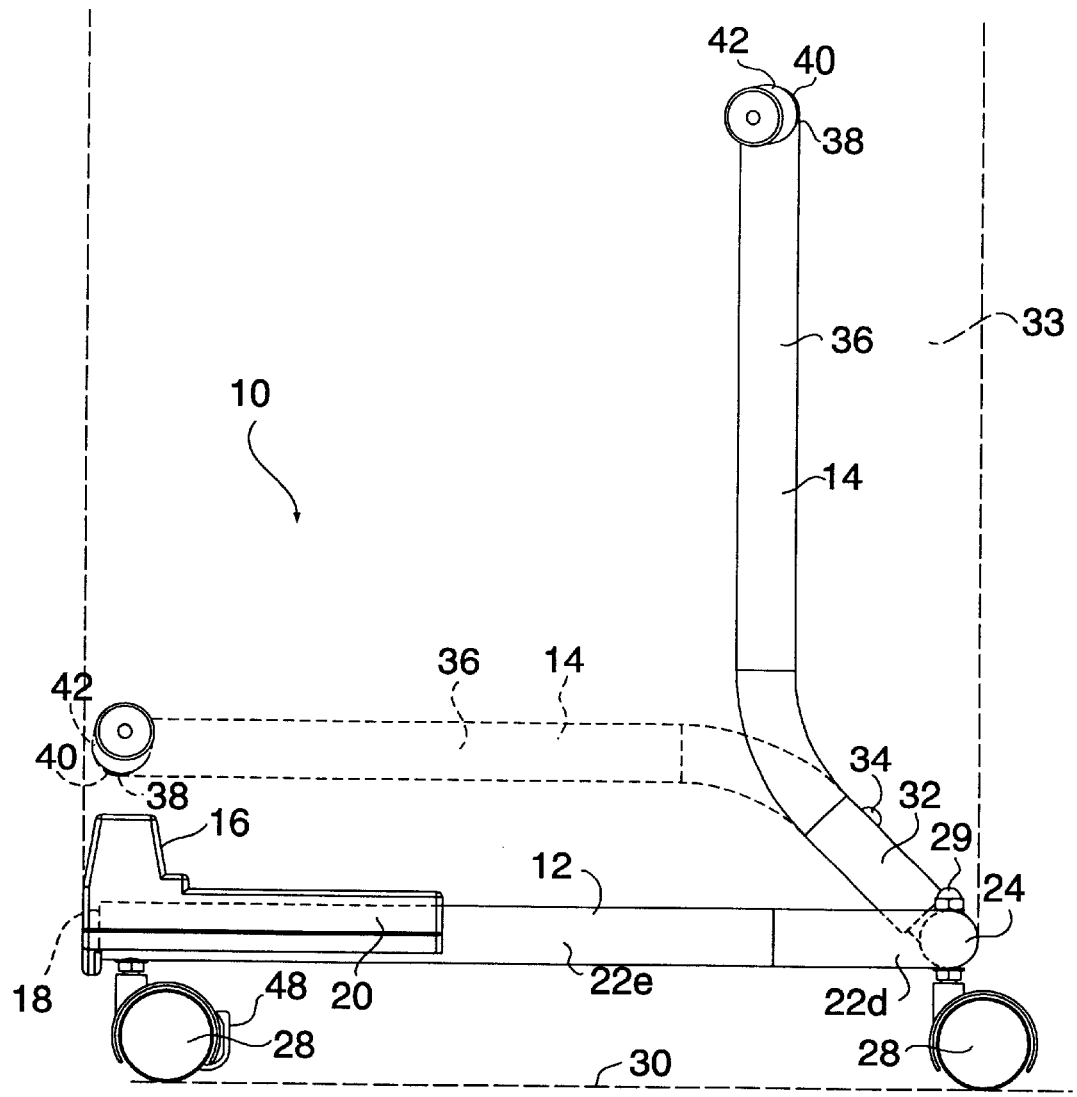
FIG. 2 is a side view of the collapsible rack depicted in FIG. 1.

As shown in FIGS. 1 and 2, member 14 is T-shaped, and is received in a neck 32 of the frame 12 that positions the member 14 within a footprint 33 defined by the frame 12.

The neck 32 is designed to allow for the member 14 to rotate therein and be secured in the first or second positions by a spring detent 34 positioned in the member 14. As those skilled in the art will appreciate, rotation is but one option to permit placement of the member 14 in the first position or the second position and the spring detent 34 is but one method of locking it in position. Other options for coupling of the member 14 in the first or second position include removing the member 14 from the neck 32 and placing the member 14 back in the neck 32 in an orientation of 180 degrees to the position shown in FIG. 1. In addition, other temporary means for securing the member 14 could be used such as pins and the means might only function with the member 14 in one or the two positions. Where the neck 32 and member 14 are shaped appropriately, such as square, no additional securing means may be required.

The member 14 has a stem 36 with a free end 38 opposite a support 40, which in the case of a T-shaped member is a crossbar. Referring to FIGS. 1 and 2, the support 40 with the member 14 in the first position is generally perpendicular to the stem 36 and parallel with the abutment surfaces 16. Depending upon the material chosen for the support 40, grips 42, made from for example an elastomeric material, can be provided around the support 40 to cushion the hardtop or automotive body panel. The stem 36 of the member 14 is not straight throughout but has a 45 degree bend as shown at a in FIG. 1.

As shown in FIG. 2, the member 14 can rotate within the neck 32 on a swivel axis. Preferably when the member 14 rotates within the neck 32, the member 14 is capable of rotation from the first position to the second position and back without interference from the U-shaped frame 12.

Figure 3:
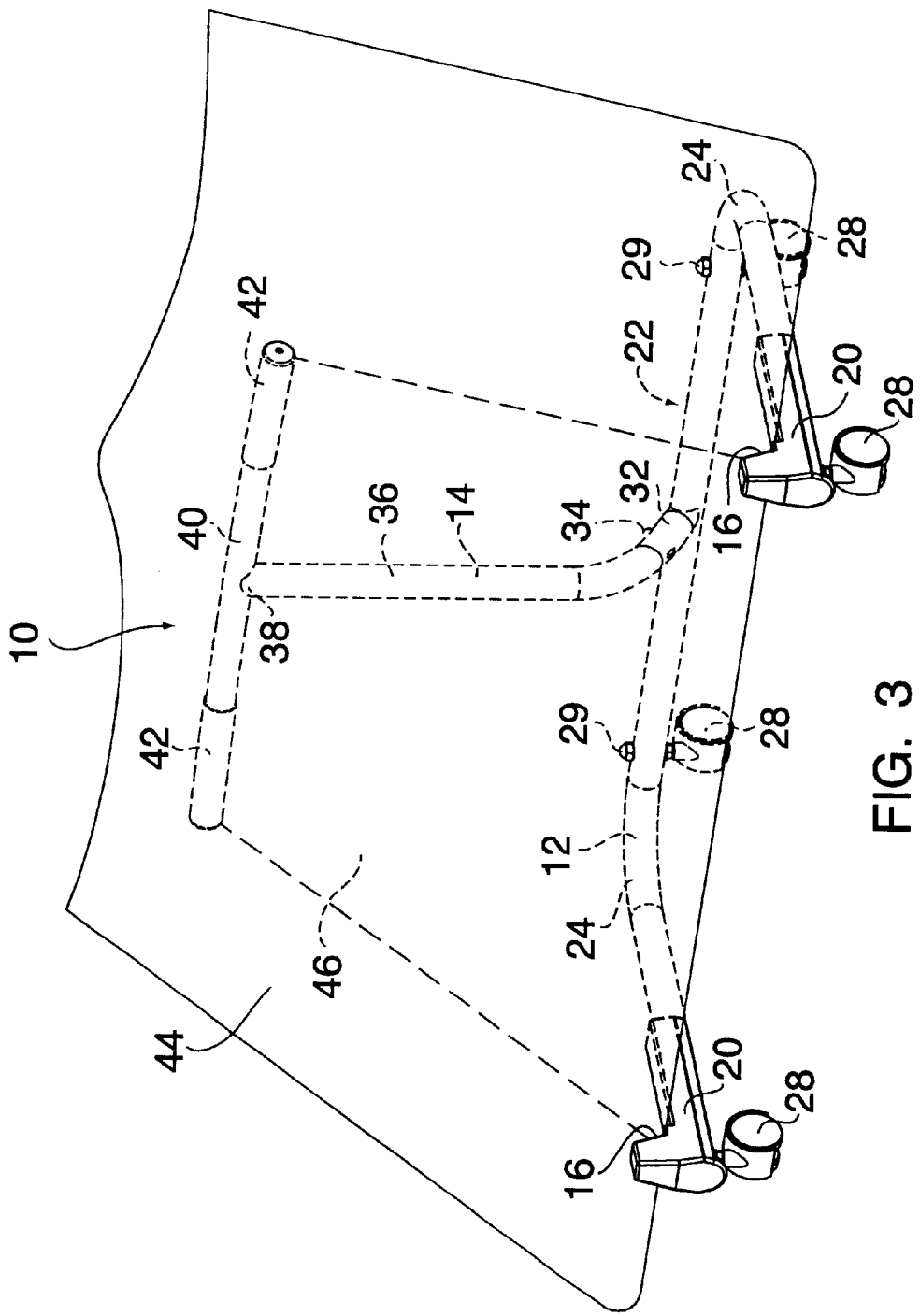
FIG. 3 is a perspective view of the collapsible rack with the member in the first position and with a hardtop positioned therein.

As shown in FIG. 3 when the member 14 is in the first position, the collapsible rack 10 will support an automotive body panel 44. The automotive body panel 44 is placed in a resting site 46 defined by the abutment surfaces 16 and the support 40, in this case more precisely grips 42. The abutment surfaces 16 are positioned to prevent movement of the automotive body panel 44 in at least one direction. In this case, the abutment surfaces 16 prevent the automotive body panel 44 from sliding along the frame 12.

FIG. 4 shows the member 14 in the second position, such that the support 40 moves closer to the abutment surfaces 16, but preferably remains within the footprint 33 of the U-shaped frame 12. In this case, the support 40 is equidistant from each abutment surface 16. Preferably in this second position, the support 40 defines a line 47 that is generally parallel to the plane 26 defined by the frame 12. As should be readily apparent, the support 40 is also closer to the frame 12 than when in the first position. The collapsible rack 10 is therefore taking up less volume. In this view, an optional feature of the wheels 28 can be seen. Any one, or all, of the wheels 28 can have a brake 48 for stopping the rotation of the wheels 28 for holding the collapsible rack 10, in either the first (loaded or unloaded) or second positions, in a location on a surface, such as a floor.

Although the present invention has been described in considerable detail with reference to the preferred version thereof, other versions are possible. Therefore, the spirit and scope of the invention should not be limited to the description of the preferred versions contained herein, but it should be construed according to the following claims.

I claim:

1. A collapsible rack for an automotive body panel comprising:

an open U-shaped frame having forwardly directed legs, and abutment stops provided on the free ends of these legs to receive a body panel, said U-shaped frame further including a base non-rotatably connecting the legs at the rear ends of said legs, said base defining a socket midway between the legs, said socket having a longitudinal axis, said socket being fixed in the base, a non-linear stem projecting upwardly and forwardly from the socket and base when in an active position so as to support an automotive body panel, an end position of said stem being also received in said socket in a stowed position such that the stem is oriented at approximately 180° with respect to said active position relative to said axis of said socket.

2. The rack according to claim 1 further including a plurality of wheels attached to the frame such that the collapsible rack can roll on said wheels in said active and in said stowed position.

3. The rack according to claim 2 wherein said non-linear stem has another end, and a T-shaped member having a crossbar at said another end of said non-linear stem.

4. The rack according to claim 3 wherein said stem is of tubular configuration and includes said end portion associated with said socket oriented at an angle relative to the other end of said stem portion associated with said T-shaped crossbar.

5. The rack according to claim 4 wherein the stem and T-shaped crossbar portion are provided within a footprint defined by the U-shaped frame in both said active and stowed positions of said stem.

6. The rack according to claim 5 wherein said wheels comprise castering rollers, at least some of said rollers being lockable to prevent rotation of said rollers.

* * * * *